INVENTORS
GINO F. SQUASSONI
HERMAN A. HERMANSON
ALAN F. MC CARROLL
EGON ZUROVSKIS

INVENTORS
GINO F. SQUASSONI
HERMAN A. HERMANSON
ALAN F. MC CARROLL
BY EGON ZUROVSKIS

ATTORNEYS

INVENTORS
GINO F. SQUASSONI
HERMAN A. HERMANSON
ALAN F. MC CARROLL
BY EGON ZUROVSKIS

ATTORNEYS

United States Patent Office 3,442,588
Patented May 6, 1969

3,442,588
MICROFILM RECORDING APPARATUS
Gino F. Squassoni, Pittsford, Herman A. Hermanson, Fairport, and Alan F. McCarroll and Egon Zurovskis, Rochester, N.Y., assignors to Xerox Corporation, Rochester, N.Y., a corporation of New York
Filed Dec. 15, 1966, Ser. No. 601,883
Int. Cl. G03b 27/44
U.S. Cl. 355—54        10 Claims

ABSTRACT OF THE DISCLOSURE

An apparatus for recording a stack of documents onto a light sensitive material which is in the form of a microfilm sheet to produce a microfiche. An optical system collimates light rays of each document recorded onto an array of imaging lenses positioned to focus a full frame image on the microfilm sheet. An aperture mechanism is selectively indexed to admit light rays to the imaging lenses to record in a predetermined pattern.

This invention relates to recording apparatus and, more particularly, to improved photographic apparatus for recording documents onto a sheet of film in prearranged rows and columns of microimages whereby the film sheet may serve as an information storage device.

This country is undergoing an information explosion as has never before been experienced. An important aspect of this information explosion is the demand for a satisfactory storage and retrieval system for this information. Of all the forms in which information can be stored and retrieved, microfilm is by far the most common. Indeed, many libraries have a section devoted exclusively to information stored on microfilm.

In the field of microfilming, a microfiche is a single sheet of film containing sequences of microimages and is provided with a border area for titles, authors, names, classification data, etc., which can be read by the unaided eye. A microfiche is an ideal form for containing related images and is unsurpassed when compared to other systems or microfilming for economy, storage, ease of handling and print-out for images that represent many pages of a single report or books that are to be occasionally or extensively reproduced for wide distribution.

A microfiche may contain anywhere from 1 to 112 microimages, depending upon the size of the form film sheet or the number of documents to be recorded on a microfiche card. For recording and storing images of periodicals, books or reports having 1 to 112 pages, a single microfiche will accomplish the purpose as opposed to the need for the same number of aperture cards as there are pages. The storage of a single film sheet requires far less space than a bundle of aperture cards, and the handling of a single film sheet for processing and print-out involves far less manipulative steps than that necessary for processing and print-out aperture cards. This ease of handling for all phases in microfilm use is further compounded when microimages are to be used as masters to produce other microimages.

A major drawback to the use of microfiche is that the assemblage of the photographic transparencies in an orderly pattern usually consisting of vertical columns and horizontal rows is slow and cumbersome. Normally a single row of photographic image frames is formed on a single narrow film strip and then the separate strips are pasted onto a backing substrate to form the completed microfiche film card. Due to the minute size of the image frames the tolerances allowed in aligning these strips is critical. Thus, it is very difficult to place film strips accurately enough so that the individual frames are precisely located on the vertical and horizontal coordinates of the card. Unless the image frames are accurately located, the use of automatic page locating readers or automatic print-out equipment, both of which require frames to be placed accurately on the coordinates, is not feasible. For this reason the location of the image frames relative to the card form and relative to each other is of the utmost importance.

Still another attempt in the production of the microfiche cards has been by the use of a step and repeat camera by which the microfilm is indexed in horizontal and vertical movements relative to the optical axis for each document recorded. This type of mechanism, however, is awkward and high in cost and for these as well as other reasons has not proven entirely satisfactory for the preparation of a microfiche.

Now in accordance with the present invention there is described an improved apparatus for the rapid preparation of microfiche. The apparatus is simple in nature and does not require step and repeat movement between the optical axis and the microfiche.

It is therefore an object of this invention to improve apparatus for producing a microfiche suitable for the storage of document information.

It is also an object of this invention to record documents in rapid succession on microfilm without step and repeat movement of the film relative to the optical axis.

It is another object of this invention to enable the production microfiche by a camera system more simple and rapid than heretofore.

It is another object of this invention to facilitate the storage of document information on photographic film.

The above objects as well as other features and advantages of the invention are accomplished, generally speaking, by casting parallel light rays of document information onto an array of imaging lenses each positioned to focus a full frame image of a document onto a microfiche film sheet and selectively admitting light rays to each imaging lens in a predetermined order.

For a better understanding of the invention, reference is now had to the following detailed description of the invention to be read in connection with accompanying drawings herein:

Figure 1:
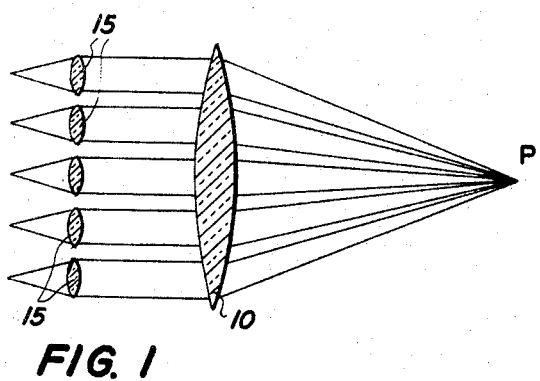
FIG. 1 is a diagrammatic view which illustrates the optical principles underlying the invention.

The underlying principles of the present invention are best understood in conjunction with the optical ray diagram shown in FIG. 1. It is a well-known optical principle that light rays emanating from a point located at the focal point of a collimating lens will emerge from the lens parallel to the chief ray. Conversely, it is also known that parallel light rays striking an imaging lens will be brought to focus at the focal point of the imaging lens. Thus, it will be observed that light rays from a single point P after passing through a collimating lens 10 and then through a plurality of imaging lenses 15 located on axes parallel to the collimated light rays are brought into focus at the focal points of the respective imaging lenses. As will be presently shown, these principles of optics are utilized in the present invention for recording document information on a sheet of light sensitive material.

Figure 2:
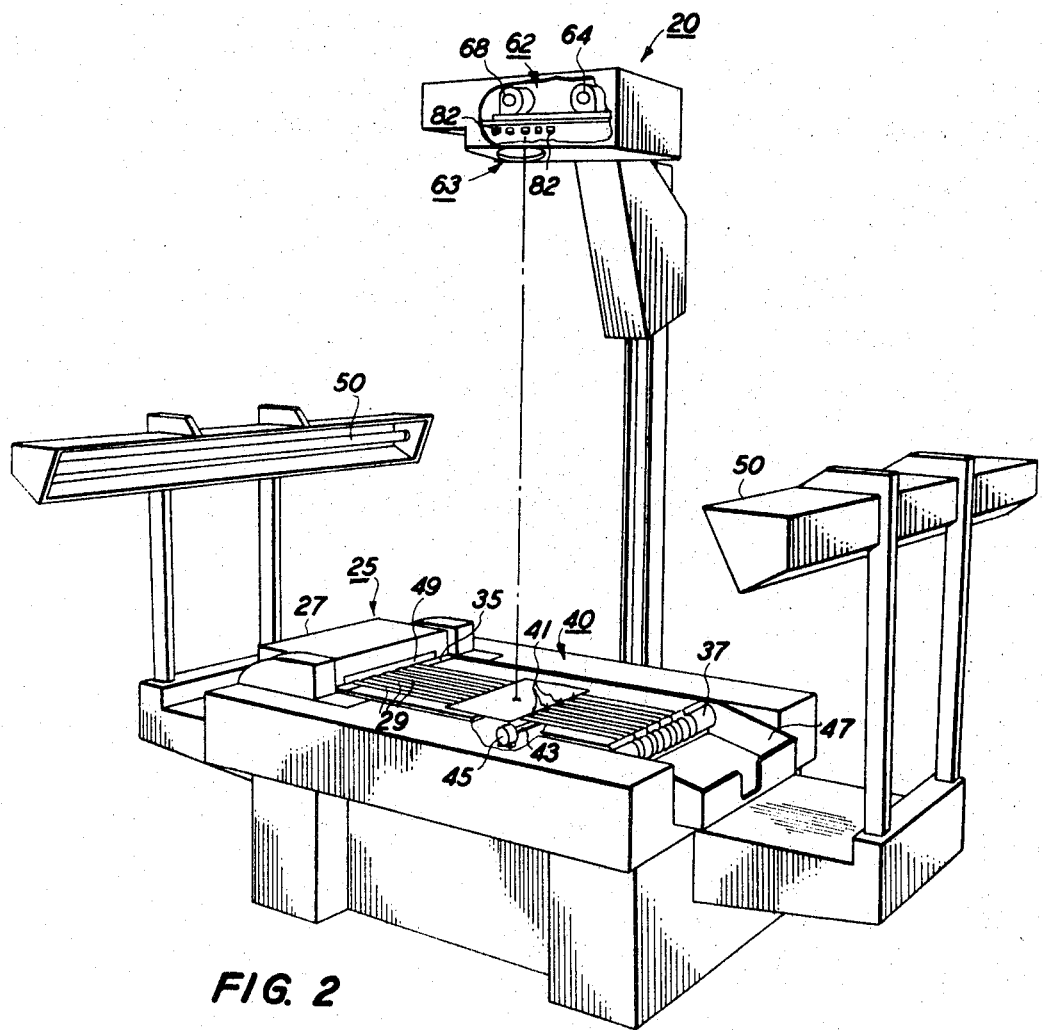
FIG. 2 is a schematic view of a preferred embodiment of the invention.

Referring now to FIGURE 2, there is shown a preferred embodiment of the invention by which a stack of documents is fed past a camera system 20 which records the documents in rapid sequence on light sensitive material 22, which in this case is in the form of a microfilm sheet. Such an image arrangement on microfilm is particularly advantageous in the production of microfiche.

Documents to be recorded are transported to an exposure position below camera system 20 on a transport assembly generally designated 25. Transport assembly 25 comprises a frame 27 on which is a plurality of continuously moving endless belts 29 supported on their ends by a pair of rollers 35 and 37 journaled in the frame. To move the belts, one of the rollers is driven by a suitable power drive (not shown). At the exposure position is a gate 40 comprising a plurality of pins 41 interposed between the belts and connected at one end to a shaft 43 rotatably supported in the frame below the belts. Shaft 43 is connected at one end to a rotary solenoid 45 normally spring biased such that the pins 41 normally project above belts 29 to arrest a document moved by the belts at the exposure position. After recording, rotary solenoid 45 is momentarily energized to depress pins 41 below the belts which allows the belts to transport the exposed document past the exposure position toward an output tray 47. At the same time another document is fed through a slot 49 formed in the frame onto the continuously moving belts which advance it toward the exposure position. Any suitable paper feed mechanism may be used to feed a stack of documents through a slot 49 as this does not form a part of the present invention.

A plurality of fluorescent lamps 50 are supported on frame 27 to provide a uniform intensity of illumination on the document as required for proper exposure of film sheet 22. It is to be understood that any suitable source of illumination may be used for this purpose including the flash variety.

Figure 3:
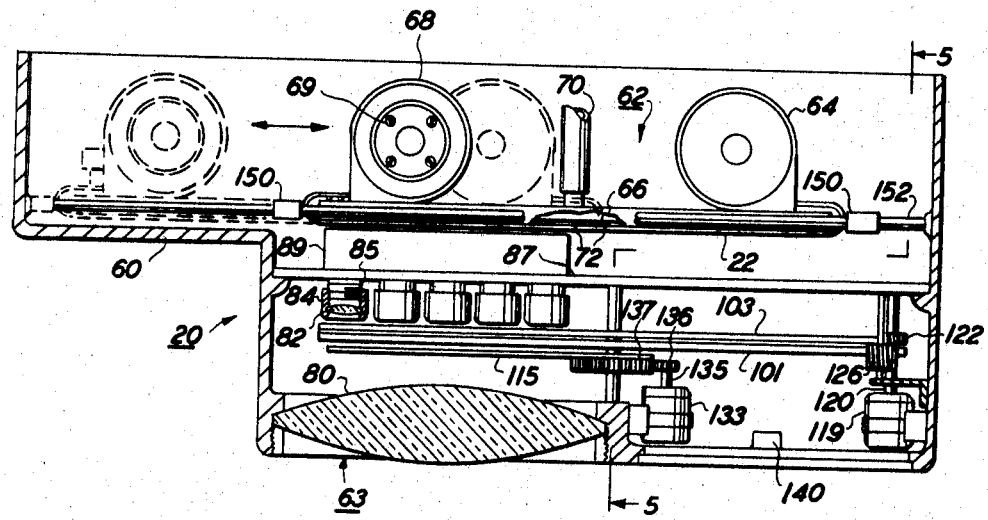
FIG. 3 is a side sectional view of the camera system shown in FIG. 2.
Figure 4:
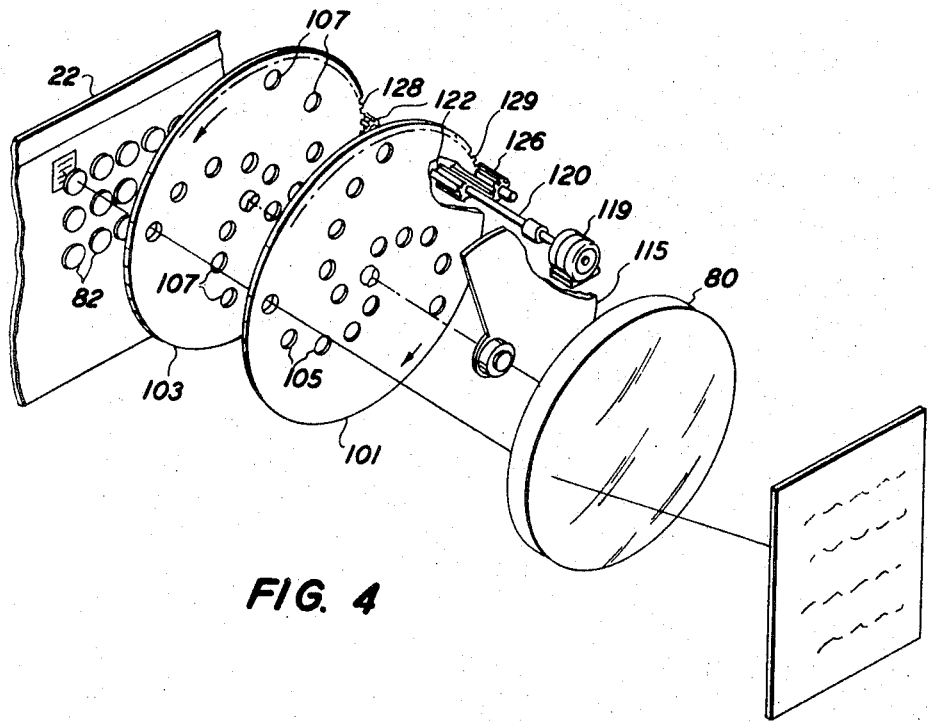
FIG. 4 is an exploded isometric view of certain details of the camera system.
Figure 5:
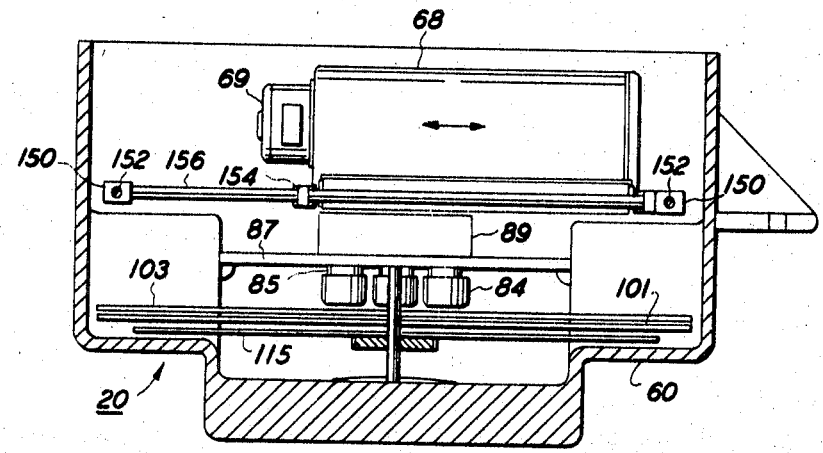
FIG. 5 is a sectional view taken along line 5—5 of FIG. 3.

Camera system 20 comprises a box-like housing 60 in which is located a film transport assembly 62 and an optical system 63 by which film 22 is exposed in rapid sequence to documents transported past the exposure position to make up a desired microfiche pattern. As best shown in FIG. 3, film transport assembly 62 comprises a supply reel 64 from which a wide strip of film is supplied in a path across a platen 66 before being received onto a take-up reel 68. To advance the film along its transport path, there is a motor-brake device 69 connected to reel 68.

It is desirable that the film remain absolutely stationary during exposure and fixed in the focal plane of the optical system for the camera. To this end a vacuum is exerted through a hose 70 to apertures 72 formed in platen 66 whereby the film is held tightly against the platen during the exposure. After recording what constitutes image frames making up a microfiche, the vacuum effect is released and the film advanced for presenting another area thereof for another series of image frame exposures on the next microfiche.

A series of documents stopped at the exposure position are optically recorded on the film sheet 22 in rapid sequence in a predetermined pattern to form a microfiche.

Optical system 63 comprises a large object lens 80 and an array of imaging lenses 82 arranged in overlying relationship with the exposure position of the documents. Object lens 80 serves to collimate and project light rays of the document toward the imaging lenses 82 which are positioned in the field of view of object lens 80 in vertical columns and horizontal rows to focus light rays received onto the film sheet in the same pattern.

Figure 6:
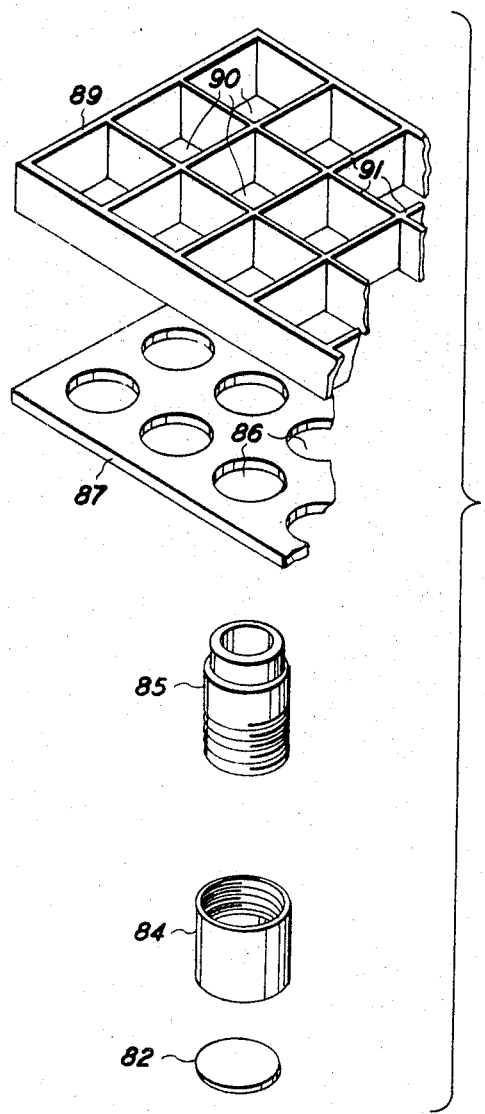
FIG. 6 is a fragmentary isometric view illustating details in the arrangement of an imaging lens.

To properly focus each document image, imaging lenses 82 may be individually moved toward and away from the surface of the film. To accomplish this, each imaging lens 82 is received in a cap member 84 which is internally threaded so as to be receivable on an associated externally threaded rod member 85. Rod members 85 are pressed into openings 86 formed in a support member 87 on frame 60. No overlap should exist between light rays emerging from the imaging lenses. For this reason, a mask in the form of a honeycomb element 89 is interposed between support member 87 and film sheet 22. The mask is formed with openings 90 having dimensions approximately equal to those of a microimage and frame elements 91 which lie upon film sheet 22 in the spaces between the microimages (see FIG. 6).

Figure 7:
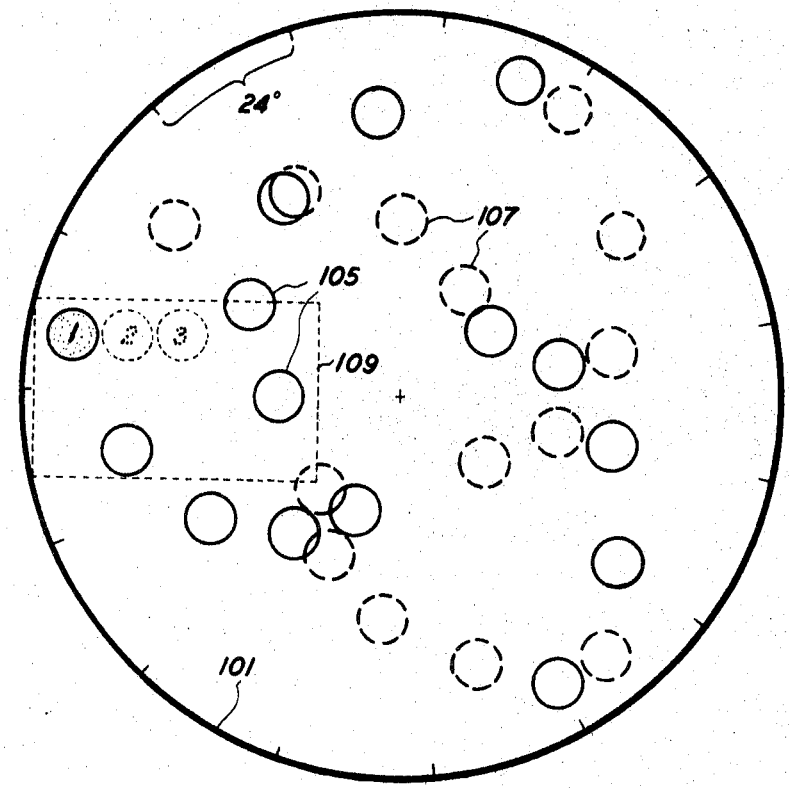
FIG. 7 shows a plan view of the aperture discs in overlying relationship with the imaging area.
Figure 8:
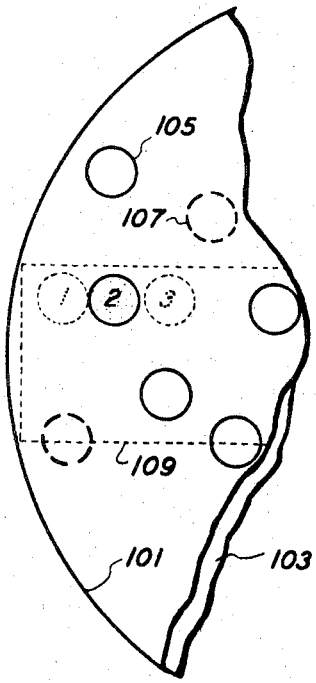
FIG. 8 is a partial plan view of the aperture discs shown in FIG. 7 indexed for the next image frame.

In order to selectively record one document at a time in a prearranged pattern, an aperture mechanism adapted for indexing to different aperture positions relative to the optical axis is interposed in the optical path between the object lens and imaging lenses. The aperture mechanism is in the form of two discs 101 and 103 having pluralities of apertures 105 and 107, respectively, arranged therein. As best shown in FIGS. 7, 8, apertures 105 and 107 (illustrated in dashed lines) are the same size which corresponds with that of imaging lenses 82, a portion of which have been identified as 1, 2, 3 representing the order in which the images are received inside the image frame area represented by dashed portion 109. Apertures 105 and 107 are arranged in a series of spiral patterns each of which corresponds to a horizontal row of images with the number of apertures in each spiral corresponding to the number of columns or image frames in a horizontal row. The spacing of the apertures is such that upon rotation of each disc in movements of equal increments a single aperture therein will become aligned with a different one of the imaging lenses. Upon a complete revolution of the discs there has been an aperture alignment with all of the imaging lenses. Hence there is one aperture on each disc for each imaging lens. In this case there are three spiral patterns, one for each row of imaging lenses with five apertures in each spiral for the number of columns or lenses in a horizontal row for a total of fifteen apertures. It is to be understood that this number of imaging lenses and corresponding apertures is merely for purposes of illustration and is not in any sense limiting on the invention.

As can readily be appreciated, different portions of the image frame area 109 would be exposed in the case of one aperture disc. For this reason the aperture mechanism should comprise at least two discs with aperture patterns arranged as already described. The discs rotate in opposite directions on the same axis so as to allow aperture pairs to become aligned with imaging lenses 82. Due to the relatively small image frame area only one pair of the apertures 105 and 107 become aligned therein to admit light rays selectively toward film sheet 22.

With each indexed movement of 24° (360/15) radial movement of the discs a different pair of apertures 105, 107 are aligned with a different imaging lens. It should be noted that aperture alignment shifts toward the right as illustrated by the shaded portions shown in FIGS. 7, 8. This shift would continue with each consecutive alignment until the top row is complete. At this time, apertures of another set of spiral patterns would become aligned to the far left and below the first exposed area to begin another cycle for that row of image frames and so on unitl each row of image frames is complete. It will be readily appreciated that vertical columns and horizontal rows of image frames produced in the manner described will result in a microfiche having image frames in vertical columns and horizontal rows.

To drive discs 101 and 103 a stepping motor 119 drives a shaft 120 on which is mounted a gear 122 meshing with an idler gear 126 and also with gear teeth 128 on disc 103. Idler gear 126 meshes with gear teeth 129 on disc 101 to effect the desired counter-rotation of the discs. Alternatively, a solenoid coupled with a one-way clutch or ratchet may be used to drive shaft 120 in place of stepping motor 119.

The intermittent movement of discs 101, 103 is controlled in timed relation with the movement of a shutter member 115. Shutter member 115 is driven continuously by a motor 133 via a shaft 135 and gears 136 and 137 at a rate to render a proper exposure of film sheet 22. This rate as well as the shape of the shutter member depend upon such factors as the ASA rating of the film, the intensity of illumination available, and the time for positioning a document for exposure. A controller 140 is provided for supplying discrete signals at timed intervals to stepping motor 119. Upon receipt of a signal, discs 101, 103 are advanced in increments of 24° in opposite directions to align one of the aperture pairs when the leading edge of shutter element 112 is in position to expose film sheet 22. This is repeated for each exposure cycle until a group of fifteen image frames have been recorded on film sheet 22 at which time another series of exposure cycles is ready to commence.

Figure 9:
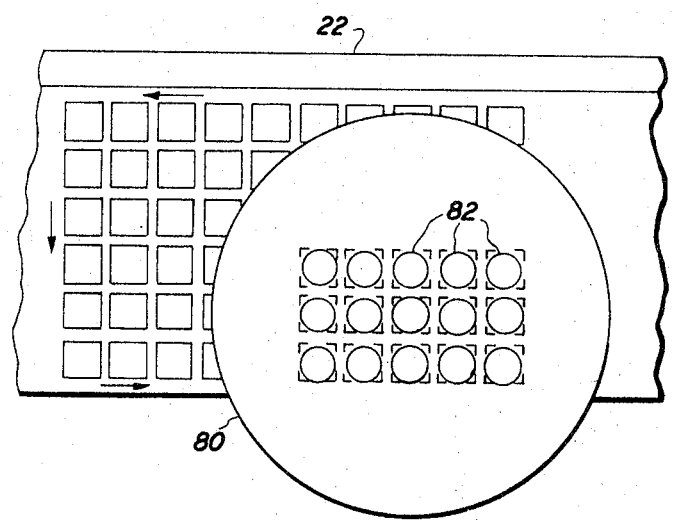
FIG. 9 illustrates schematically the sequential exposure of a sheet of photosensitive film to produce a desired microfiche frame pattern as provided by the invention.

It is often desirable to make a great number of exposures in a microfiche group. To accomplish this feature without the necessity of advancing film sheet 22 along its path, film transport assembly 62 is movable at right angles to optical system 63. To this end the film transport assembly is supported on blocks 150 which are movable on guide rails 152. In similar fashion, blocks 154 and guide rails 156 are also provided for movement in a direction perpendicular to the film path as indicated by the arrows in FIG. 6. Thus the number of image frames may be multiplied by four with as few as three sliding movements of transport assembly 62. As indicated by the arrows in FIG. 9, film sheet 22 is moved first to the left of the optical system then downward and finally to the right to produce a greatly increased number of image exposures for a microfiche group.

Above is described an apparatus for recording documents as microimages upon a film sheet for use as microfiche cards. Heretofore, bulky and costly apparatus was necessary to move the optical axis relative to the film or vice versa to avoid irregular spacing of the images. With the present invention multiple image frames correctly spaced in a predetermined pattern can be recorded on microfilm just as soon as the documents can be positioned for exposure without complicated manipulations of the apparatus. Hence, the inventive apparatus, while simple in nature, provides a unique solution to the long standing problem of making a microfiche quickly and reliably.

While the invention has been described with reference to the structure disclosed herein, it is not confined to the details set forth in this application and is intended to cover such modifications or changes as may come within the purpose of the improvements or the scope of the following claims.

What is claimed is:

1. Apparatus for presenting light rays indicative of document information on a light receiving sheet in a predetermined pattern comprising:
    means for individually positioning documents sequentially at an illumination station,
    means to illuminate each document while positioned at said station,
    collimating object lens means arranged in an optical path between said illumination station and the light receiving sheet for collimating light rays emerging from a document positioned at said illumination station,
    an array of imaging lenses arranged in vertical columns and horizontal rows in said optical path within the field of view of said object lens for imaging the document onto the sheet in as many places thereon as there are imaging lenses,
    aperture forming means interposed between said object lens means and said imaging lenses and being operative to selectively index an aperture opening in alignment with each of said imaging lenses to record a predetermined pattern of image frames onto said sheet.

2. Apparatus according to claim 1 including a shutter member adapted for movement relative to said aperture forming means and means for moving said shutter member at a rate to render a predetermined exposure of said sheet for each of said aligned aperture openings.

3. Apparatus according to claim 1 wherein said aperture forming means includes a pair of parallel spaced apart discs mounted for rotation on a common axis, said discs having a plurality of apertures formed therein in patterns arranged such that upon a complete revolution of said discs, an aperture from each disc becomes aligned with each other and with each of said imaging lenses in a predetermined sequence.

4. Apparatus according to claim 1 including a transport means for advancing the film sheet along a path extending in the focal plane, said transport means being mounted on a support carriage slidable in the focal plane at right angles to the optical axis.

5. Apparatus according to claim 1 wherein said imaging lenses are arranged in individual housings adapted for displacement along their respective optical axis.

6. Apparatus according to claim 3 including drive means for moving said discs in opposite directions at a rate in timed relation with the movement of said shutter member.

7. Apparatus according to claim 3 wherein each aperture pattern has a series of spirals, each spiral being representative of a horizontal row of imaging lenses with the number of apertures therein corresponding to the number of imaging lenses in an associated horizontal row.

8. Apparatus for presenting light rays indicative of document information on a light receiving sheet in a predetermined pattern comprising:
    means for individually positioning documents sequentially at an illumination station,
    means to illuminate each document while positioned at said station,
    collimating object lens means arranged in an optical path between said illumination station and the light receiving sheet for collimating light rays emerging from a document positioned at said illumination station,
    an array of imaging lenses arranged in vertical columns and horizontal rows in said optical path within the field of view of said object lens for imaging the document onto the sheet in as many places thereon as there are imaging lenses,
    a first light masking member interposed between said object lens means and said imaging lenses,
    a second light masking member coextensive with said first light masking member and spaced therefrom,
    said first and second light masking members being mounted for rotation coaxially with an axis extending parallel to said optical path and having a plurality of apertures formed therein in different patterns arranged to effect alignment of an aperture from each light masking member with each other and with each imaging lens upon a single revolution of said light masking members, and
    control means operatively connected to said masking members to move the same intermittently and simultaneously in equal arcs thereby selectively indexing an aperture opening in alignment with each of said imaging lens in a predetermined sequence to record image frames on said sheet in a predetermined pattern.

9. Apparatus according to claim 8 including a shutter member mounted for rotation on an axis parallel to said optical axis and means for rotating said shutter member at a rate to render a predetermined exposure of said sheet.

10. Apparatus according to claim 9 wherein said control means includes a device to emit discrete signals to a drive motor at predetermined time intervals established by the rate at which said shutter member is moved, said drive motor being drivingly connected with said light masking members to effect synchronized movement between the aforesaid aperture alignment and said shutter member.

References Cited

UNITED STATES PATENTS

| 3,261,259 | 7/1966 | Baptie et al. | 88—24 |
| 3,299,776 | 6/1967 | Baptie et al. | 88—24 |

FOREIGN PATENTS 348,090  10/1929  Great Britain.

NORTON ANSHER, *Primary Examiner.*

RICHARD A. WINTERCORN, *Assistant Examiner.*

U.S. Cl. X.R.

95—53; 178—6; 352—68